(No Model.) 2 Sheets—Sheet 1.
E. R. FELLOWS.
APPARATUS FOR TURNING IRREGULAR SHAPES.
No. 499,977. Patented June 20, 1893.
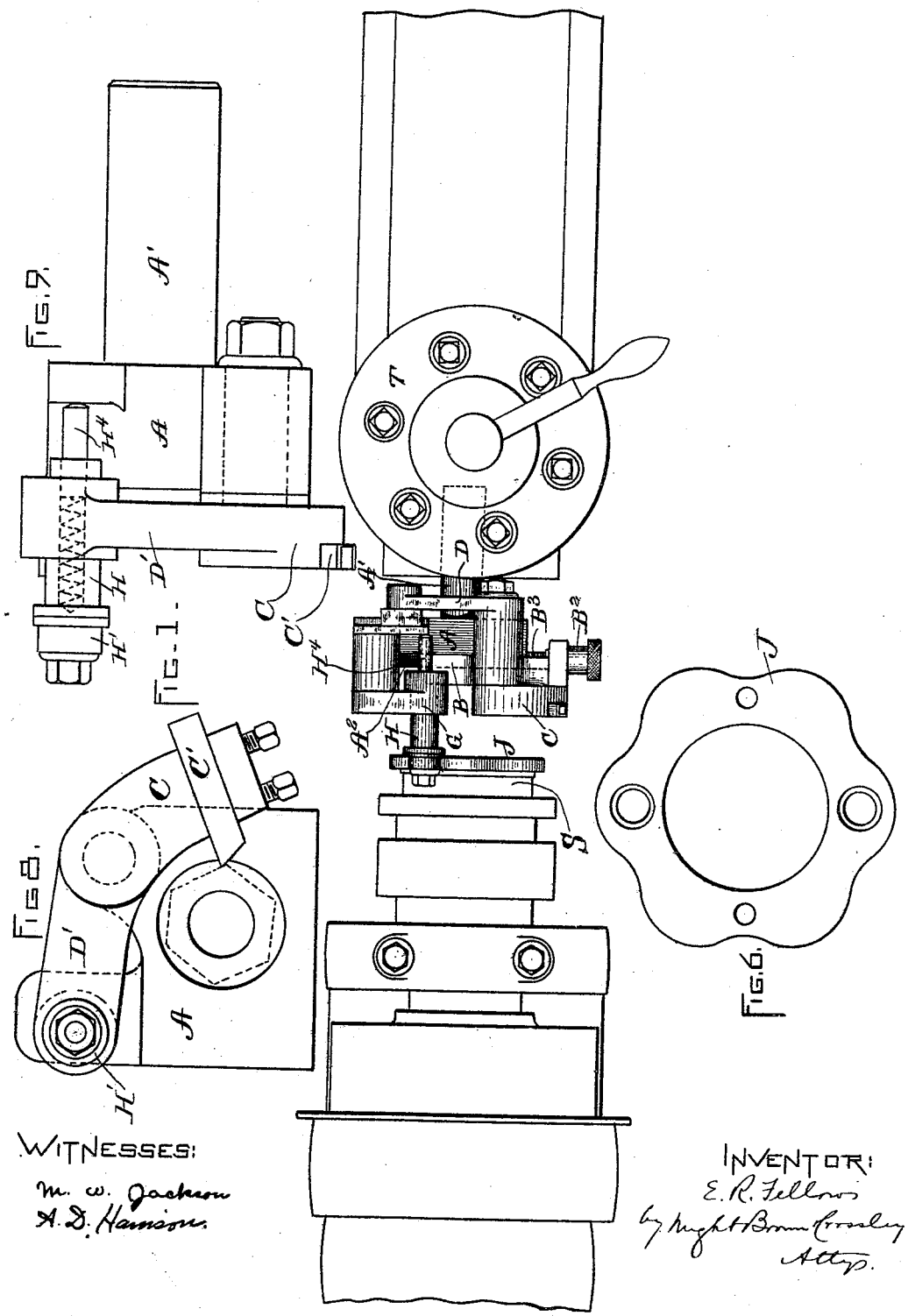
WITNESSES:
M. W. Jackson
A. D. Harrison.
INVENTOR:
E. R. Fellows
by Wright Brown Crosley
Attys.
THE NORRIS PETERS CO., PHOTO-LITHO., WASHINGTON, D. C.

(No Model.)  2 Sheets—Sheet 2.
E. R. FELLOWS.
APPARATUS FOR TURNING IRREGULAR SHAPES.
No. 499,977. Patented June 20, 1893.
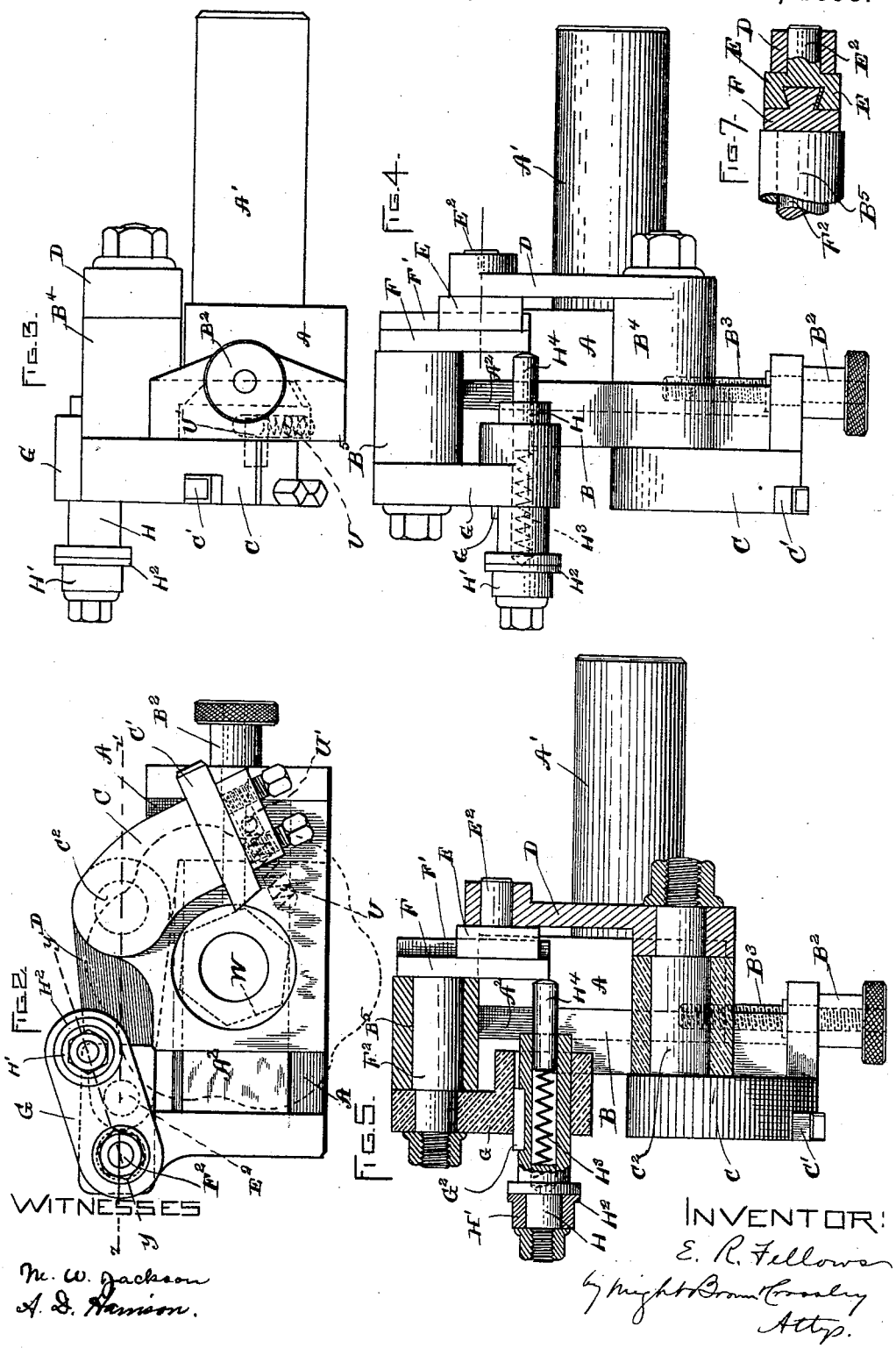
WITNESSES
M. W. Jackson
A. D. Harrison
INVENTOR:
E. R. Fellows
by Wright Brown Crosby
Attys.

UNITED STATES PATENT OFFICE.

EDWIN R. FELLOWS, OF SPRINGFIELD, VERMONT.

APPARATUS FOR TURNING IRREGULAR SHAPES.

SPECIFICATION forming part of Letters Patent No. 499,977, dated June 20, 1893.

Application filed June 6, 1892. Serial No. 435,660. (No model.)

*To all whom it may concern:*

Be it known that I, EDWIN R. FELLOWS, of Springfield, in the county of Windsor and State of Vermont, have invented certain new and useful Improvements in Apparatus for Turning Irregular Shapes, of which the following is a specification.

This invention has for its object to provide mechanism for turning or boring metal in any desired form other than circular, and particularly for turning hexagonal and square forms.

The invention consists in the construction and combination of parts as hereinafter described and claimed.

Of the accompanying drawings, forming part of this specification: Figure 1 represents a plan view of a portion of a lathe spindle and turret provided with my improved mechanism. Fig. 2 represents an end view of that portion of the apparatus which is attached to the turret. Fig. 3 represents a side elevation of the portion of the apparatus shown in Fig. 2. Fig. 4 represents a top view of said portion. Fig. 5 represents a section taken on the planes of lines $y, y'$ and $z, z'$, Fig. 2. Fig. 6 represents a side view of the cam or pattern attached to the work-holding spindle. Fig. 7 represents a section on line 7,7, Fig. 4. Figs. 8 and 9 represent a modification.

The same letters of reference indicate the same parts in all the figures.

In the drawings: A represents a holder or body, which may be secured in any suitable way to the turret T, the connection being preferably effected by means of a cylindrical shank A', formed on the holder A, and fitted in a socket formed for its reception in the turret. The turret is or may be of any suitable construction, and forms no part of my invention.

B represents a slide, which is fitted to move upon a dove-tail guide $A^2$ on the holder A, and may be adjusted on said holder and held at any position to which it may be adjusted by means of an adjusting nut $B^2$, journaled in a bearing on the slide B, and a screw-threaded rod $B^3$, affixed to the holder A and engaged with the nut $B^2$.

C represents a tool-holder, which is affixed to a rock-shaft $C^2$, fitted to turn in a sleeve or bearing $B^4$ on the slide B.

To the tool-holder C is affixed a tool C', which may be adjustably secured to the tool-holder by any suitable means, and may be formed to act in any desired manner upon the work to be shaped; that is to say, it may be adapted to form an external surface or an internal surface on the work. I have here shown the tool C' as adapted to act on the exterior of the work, and to form a series of flat sides, arranged in polygonal order, the work being suitably rotated while the tool is presented to it. The tool-holder C is adapted to oscillate in the bearing $B^4$, so that the tool may have an oscillating or reciprocating movement toward and from the axial line of the work W, said work being shown in Fig. 2 in dotted lines as a hexagonal nut or piece.

S represents the work-holding and rotating chuck or spindle, which may be of the usual or any suitable construction, and is arranged in the usual relation to the turret T. To the spindle is affixed a cam or pattern J, the configuration of which will depend upon the form which it is desired to impart to the work. The form of cam shown in Fig. 6 is adapted to actuate the tool through the intermediate mechanism hereinafter described, in such manner as to produce the hexagonal form of work shown in Fig. 2, the perimeter of the cam being composed of a series of salient and re-entrant curves.

The intermediate mechanism which I employ to communicate motion from the rotating cam or pattern to the tool-holder, in the best embodiment of which I am now aware, comprises the following elements, namely, first, a trundle roll H', mounted to rotate loosely upon a shaft or arm H; secondly, an arm G, supporting the shaft H and affixed to a rock-shaft $F^2$, which is journaled in a bearing $B^5$ formed on the body A; thirdly, an arm F, affixed to the opposite end of the rock-shaft $F^2$ from that to which the arm G is affixed, said arm F having a dovetail rib or guide F'; fourthly, a slide or block E, fitted to slide upon the guide F', and provided with a stud $E^2$; and, lastly, an arm D, affixed at one end to the rock-shaft $C^2$ and pivotally connected at its other end with the stud $E^2$.

A helical spring U, shown in dotted lines in Fig. 2, bears at one end upon the bottom of a socket formed in the slide B, and at the other end upon a stud U' on the tool-holder, said spring acting to move the tool-holder away from the work W, and thus hold the trundle-roll H yieldingly against the periphery of the cam or pattern J, through the described connections between said trundle-roll and tool-holder. It will be seen, therefore, that the rotation of the cam or pattern J causes the trundle-roll and the arm G to oscillate, and impart an oscillating motion to the arm F, which in turn imparts a similar motion through the block E and arm D to the rock-shaft $C^2$, tool-holder C and tool C'. The rotation of the cam or pattern causes the arm F to oscillate through an unvarying arc, the extent of its movement being determined by the configuration of the cam. The sliding or self-adjusting connection between the arms F and D (said connection is here shown as the guide F' and block E) causes the arm F to communicate an oscillating motion to the arm D and tool-holder C, so that the tool C' is given a reciprocating motion toward and from the center of the work, and is therefore caused to impart to the rotating work the polygonal or other form for which the cam or pattern was designed. The said sliding connection enables the tool to be adjusted to produce work of any desired size without varying the predetermined form. When the parts are adjusted so that the arm F and its guide F' are parallel with the guide on which the slide B is movable, said slide may be moved to any desired extent to carry the tool toward or from the axial line of the work, the block E sliding on the guide F' so that the leverage of the arm F on the arm D changes exactly as the distance between the point of the cutting tool and the center of the work changes. Hence the adjustment of the tool toward or from the axis of the work affects the size but not the form of the work. This provision for the production of any desired size of a given form of work is one of much importance.

In all devices heretofore employed, of which I am aware, for turning polygonal forms, the construction and arrangement has been such that, in adjusting the apparatus to cut different sizes, there will inevitably be a variation of the form. For example, if the apparatus is adapted to properly form a piece of work two inches square, any adjustment for cutting a smaller size will produce work with concave sides, and any adjustment to increase the size will produce work with convex sides. This objection I entirely obviate by providing an arm adapted to be oscillated in an unvarying arc by the cam, a tool-holder adapted to oscillate or reciprocate toward and from the center of the work, and intermediate connecting mechanism whereby any desired extent of oscillating or reciprocating movement may be imparted from the cam-operated arm in the tool-holder, said mechanism including two general parts, one of which, as here shown, is the rock-shaft $F^2$, arm F and its guide F'; and the other the rock-shaft $C^2$ and arm D; and a sliding or self-adjusting connection between said parts.

I do not limit myself to the details of construction of the connecting mechanism here described, and may vary the same, as well as the sliding or self-adjusting connection, in any desired manner, without departing from the spirit of my invention, so long as the desired result is attained, namely, the imparting of any desired length of reciprocating motion to a tool, from an arm or part to which an unvarying reciprocating or oscillating motion is given by a cam or pattern.

I do not limit myself to the employment of the described improvements in connection with a rotating cam J and a non-rotating holder or body A, as, if desired, the cam may be held stationary and the body A rotated, thus giving the tool-holder and tool a revolving motion around the work, the latter being held stationary.

It is obvious that the tool-holder and the cutting tool may reciprocate in a rectilinear instead of in a curved path. This can be accomplished by making the tool-holder as a slide, adapted to move on a suitable guide on the slide B, and substituting for the arm D a bell-crank lever, one arm of which would be connected with the block E, and the other arm to the sliding tool-holder.

I do not limit myself in all cases to the use of the adjusting slide B, as, in case it is desired to produce only one size of work, said slide may be omitted.

The holder A and the parts carried thereby may be supplied to the market as an attachment for turret machines without the cam or pattern.

For convenience, I have shown a trundle-roll H', journaled upon the stud or shaft H, which is movable longitudinally in a guide formed in the arm G, and is connected to said guide by means of a spline $G^2$ (Fig. 5), which prevents the shaft H from rotating. A spring $H^3$, located in a cavity in the shaft H and bearing at one end against a loose pin $H^4$ normally presses the trundle-roll H' outwardly toward the cam J, by reason of the fact that one end of the loose pin $H^4$ bears against a suitable support, which may be the arm F. The trundle-roll is provided with a shoulder $H^2$, which bears against one side of the cam. As the turret advances toward the spindle S, in feeding the work, the trundle-roll yields against the pressure of the spring $H^3$. This arrangement is adopted for the sake of convenience, but it is not essential, as the same result may be produced by either making the trundle-roll H long enough or the cam J wide enough to compensate for the necessary movement of the turret.

My improved mechanism is adapted to impart to the work any form in which the angles are such as not to necessitate the cutting away of too much metal toward the end of the cutting tool. Practice proves that any angle up to ninety degrees (90°) can be formed.

My invention is not limited to the employment of the described intermediate mechanism and sliding connection between the arm or lever which bears on the cam and the tool-holder.

When it is not desired to provide adjustable connection between said arm and the tool-holder, the construction shown in Figs. 8 and 9 may be used. In this modification, the arm G, rock-shaft F², arm F, slide E and arm D are omitted, and the tool-holder is provided with an arm D', which supports the trundle-roll H', said roll being held in engagement with the perimeter of the cam or pattern, so that the rotation of the latter oscillates the arm D' and tool-holder C, thus giving the tool C' a back and forth motion, the result being the same as that of the construction previously described, excepting in so far as producing work of different sizes is concerned.

I claim—

1. The combination of a cam or pattern, an arm or lever held in engagement therewith, a holder or body, a rock-shaft journaled in a bearing affixed to said holder, a slide movable on said holder, a tool-holder supported by said slide, and self-adjusting connections between said tool-holder and rock-shaft whereby a back and forth motion is imparted from the rock-shaft to the tool-holder under all adjustments of the latter, as set forth.

2. The combination of a cam or pattern, an arm or lever held in engagement therewith, a holder or body, a rock-shaft journaled in a bearing affixed to said holder and provided with a movement-transmitting arm, a slide movable on said holder, a rock-shaft journaled in a bearing on said slide and provided with an arm having a sliding connection with said movement-transmitting arm, and a tool-holder provided with a cutting tool affixed to the last-mentioned rock-shaft, as set forth.

3. A tool or attachment, comprising a holder or body adapted to be secured to a turret or feeding device, a rock-shaft journaled in said holder and provided with an arm adapted to receive motion from a cam or pattern and with a motion-transmitting arm, a slide movable on said holder, a tool-carrier on said slide, and a self-adjusting connection between the tool-carrier and the said motion-transmitting arm, as set forth.

4. A tool or attachment, comprising a holder or body adapted to be secured to a turret or feeding device, a lever pivoted to said holder, one end of said lever being adapted to receive motion from a cam or pattern the other end being a motion-transmitting arm, a slide movable on said holder, a tool-carrier on said slide, and a self-adjusting connection between the tool-carrier and the said motion-transmitting arm, as set forth.

In testimony whereof I have signed my name to this specification, in the presence of two subscribing witnesses, this 28th day of May, A. D. 1892.

EDWIN R. FELLOWS.

Witnesses:
   OTIS GRIDLEY,
   W. D. WOOLSON.